May 30, 1939.　　　　　J. S. IRVING　　　　2,160,071
BRAKE
Filed April 14, 1937
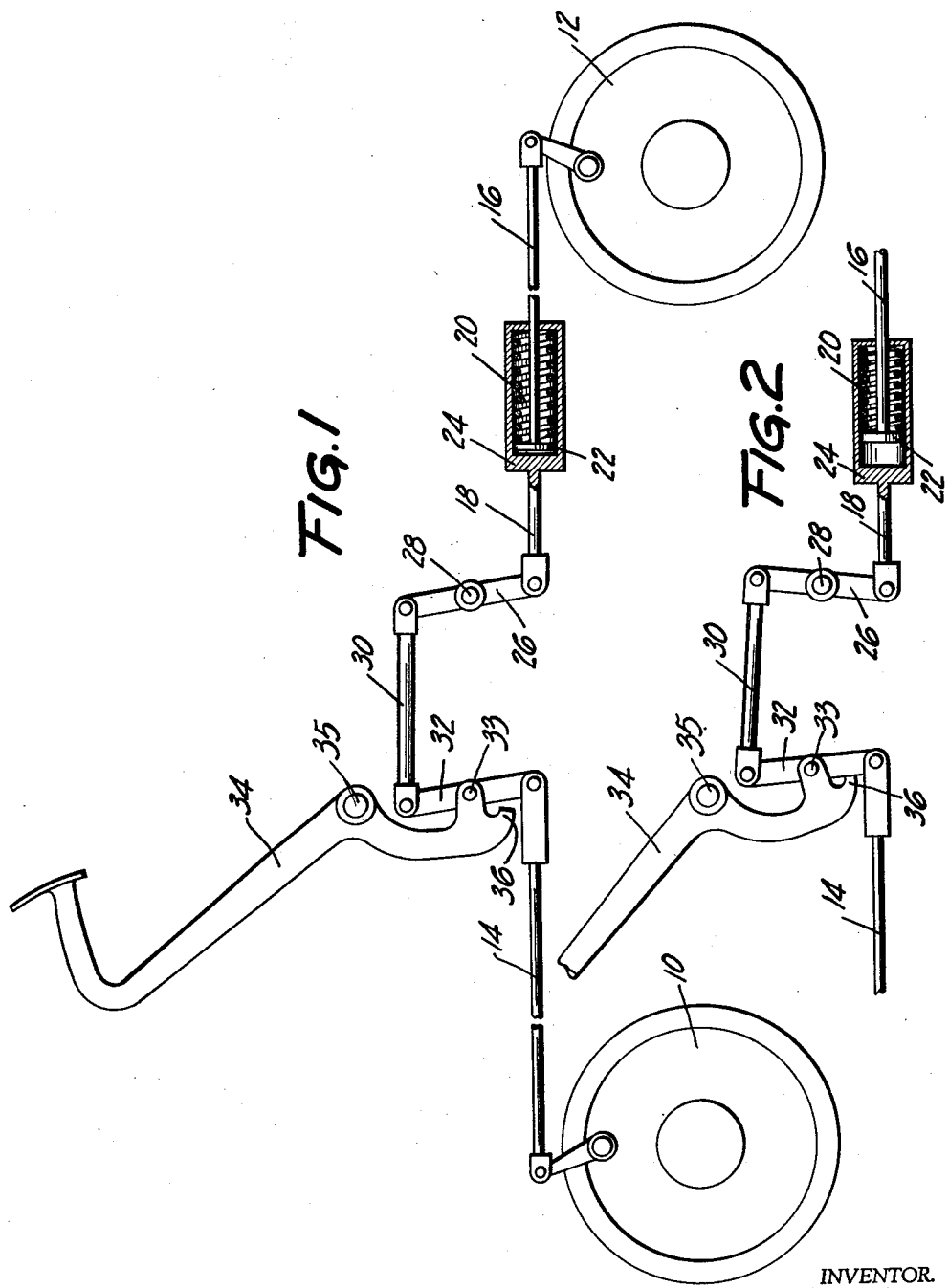
INVENTOR.
JOHN SAMUEL IRVING
BY
ATTORNEY.

Patented May 30, 1939

2,160,071

UNITED STATES PATENT OFFICE 2,160,071

BRAKE

John Samuel Irving, Birmingham, England, assignor to Bendix Products Corporation, South Bend, Ind., a corporation of Indiana Application April 14, 1937, Serial No. 136,933
In Great Britain April 25, 1936

3 Claims. (Cl. 188—10)

This invention relates to brakes, and is illustrated as embodied in an automobile having a system of four-wheel brakes.

To prevent locking of the rear wheels due to the transfer of effective weight from rear to front during deceleration, it is often desirable to design the braking system so that the braking on front and rear wheels is approximately equal in normal braking, while in case of heavy emergency braking the effect on the front wheels is increased much more than that on the rear wheels. One method of insuring this operation is to interpose a pre-loaded spring between the brake-applying means and the rear brakes. Then the force on the front and rear brakes is substantially equal up to the load at which the spring yields, and from there on the force on the front brakes increases faster than that on the rear brakes.

The present invention has to do with incorporating this system of operation in a set of four-wheel brake connections having equalizing means between the front and rear brakes. It will be appreciated that without any special means to insure the desired action, the equalizing means would nullify the effect of the pre-loaded spring or its equivalent.

According to my invention, the desired effect is secured by the use of a stop or the like which limits the action of the equalizing means. This does not interfere with the action of the equalizing means in normal braking, while preventing more than a very limited operation during heavy braking, after which the connections operate as desired.

The above and other objects and features of the invention will be apparent from the following description of the illustrative embodiment shown in the accompanying drawing, in which:

Figure 1 is a diagrammatic side elevation of the operating parts of the brake system, as they appear in normal braking; and Figure 2 is a similar view of some of the same parts as they appear in heavy braking.

In the arrangement illustrated, the invention is embodied in an automobile or other vehicle having front wheels provided with brakes 10 and rear wheels provided with brakes 12. The front brakes are operated by tension on connections such as rods 14 and the rear brakes by tension on rods 16 and 18 having a load-limiting device connected between them. The device illustrated includes a spring 20 interposed between a head 22 on the end of rod 16 and the end of a casing 24 connected to the rod 18.

The spring 20 is pre-loaded, by being partly compressed, so that it will transmit a predetermined load without yielding, beyond which point as it yields there is no additional force (or at least comparatively little additional force) transmitted to the rear brakes.

The rod 18 is shown connected to a direction-changing lever 26 mounted on a fixed pivot 28, the upper end of the lever being connected to a compression link 30 connected to suitable equalizing means, as for example being pivoted to the upper end of a floating equalizer bar 32, the lower end of which is pivoted to a fitting on the end of the rod 14.

The brake pedal 34 mounted on a fixed pivot 35, or equivalent driver-operated applying means, is connected to a mid-point on the equalizer bar 32 by a pivot 33 and thrusts rearwardly thereon when the pedal is depressed.

During normal braking the force from the pedal is distributed (usually substantially equally) between the front and rear brakes. During heavy braking, after the spring 20 yields, and after a short further movement, a stop 36 on the pedal engages the bar 32 between the pedal connection and the front brake connection, and thereafter the bar moves bodily with the pedal to apply increased force at a lower mechanical advantage to the front brakes.

While one illustrative embodiment has been described in detail, it is not my intention to limit the scope of the invention to that particular embodiment, or otherwise than by the terms of the appended claims.

I claim:

1. A vehicle having front and rear brakes, substantially unyielding connections for operating the front brakes, connections for operating the rear brakes including means yielding upon the application of a predetermined force thereto, an equalizing device connected to operate both front and rear connections and driver-operated means for operating the equalizing device and which means is provided with a stop for limiting the equalizing action thereof whereby front braking may, after a predetermined force, be increased without the operation of said equalizing device as an equalizer and without any substantial increase in rear braking.

2. A vehicle having front and rear brakes, substantially unyielding connections for operating the front brakes, connections for operating the rear brakes including means yielding upon the application of a predetermined force thereto, an equalizing bar connected to operate both front and rear connections, and driver-operated means for operating the equalizing bar and which means is provided with a stop engaged by said bar after predetermined movement for limiting the equalizing action thereof whereby front braking may, after a predetermined force, be increased without the operation of said equalizing bar as an equalizer and without any substantial increase in rear braking.

3. A vehicle having front and rear brakes, substantially unyielding connections for operating the front brakes, connections for operating the rear brakes including means yielding upon the application of a predetermined force thereto, means for equalizing front and rear brake actuation through a predetermined initial application, and means associated with said last named means for destroying the equalizing effect of said means and thereafter actuating said front brakes with reduced mechanical advantage and the rear brakes with increased mechanical advantage but through said yielding means whereby any further material increase in rear braking is substantially prevented.

JOHN SAMUEL IRVING.